June 3, 1958    J. E. HOLT    2,836,851
APPARATUS FOR EXTRUSION
Filed Sept. 9, 1955

INVENTOR.
John E. Holt
BY Nathaniel Frucht
Atty

2,836,851

APPARATUS FOR EXTRUSION

John E. Holt, Danielson, Conn., assignor to The Danielson Manufacturing Company, Danielson, Conn., a corporation of Rhode Island Application September 9, 1955, Serial No. 533,424

6 Claims. (Cl. 18—12)

This invention relates generally to extruders and more particularly to dry extrusion of plastics.

As is the case in injection molding, it is most important that the molding powder be dried before extrusion. In the extrusion of polyamides, it has heretofore been necessary to dehydrate these materials to less than three-tenths of one percent moisture in order to obtain satisfactory products. Since polyamides are extremely hygroscopic they rapidly absorb many times this minimum requirement if left open in normal room conditions. The time and equipment necessary to predehydrate polyamides is an expensive factor in product cost. Furthermore, some plasticized plastics exude a gas when heated to the molten point, which gases should be drawn off in order to obtain best production results. Some of the difficulties which result from the failure to remove the excessive moisture content from the plastic being extruded or from the failure to draw off the gases exuded are frothing at the die or crosshead, bubbles and porous condition (particularly in heavy sections) and splits in wire coating where this is the operation being performed.

Accordingly, the principal object of this invention is the provision of an extruder which will permit use of moist plastics or plastics with volatile ingredients.

A further object is the provision of an extruder which causes moisture and volatile gases carried by the plastic being extruded to be drawn off during the extrusion operation.

Still another object of the instant invention is the provision of an extruder which is simple and efficient in operation and which will produce a highly satisfactory product at greatly reduced production costs.

Other objects, features and advantages of the invention will become apparent as the description thereof proceeds when considered in connection with the accompanying illustrative drawings.

In the drawings which illustrate the best mode presently contemplated by me for carrying out my invention:

Figure 1:
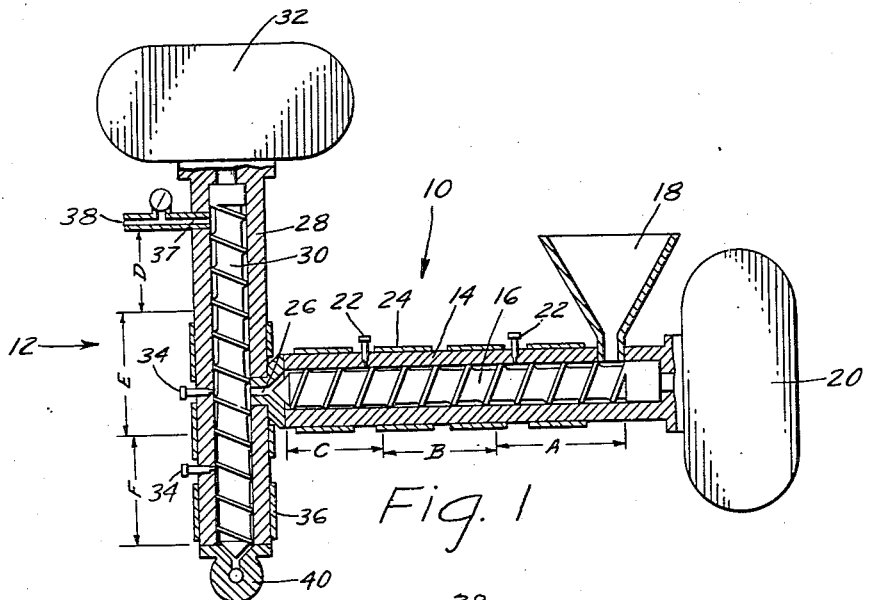
Fig. 1 is a side elevation in section of the preferred form of my extruder.

Referring now to the drawings, and more particularly to Fig. 1 thereof, it will be noted that my novel extruder comprises two sections, a first stage 10 and a second stage 12. Stage 10 comprises a conventional extruder cylinder 14 and screw 16, the screw consisting of the usual feed, pressure and metering zones designated respectively at A, B, and C. A hopper 18 is provided for introducing the molding powder, usually in granular form, to the extruder, while the usual drive motor, variable speed drive and gear reducer are shown at 20. Thermocouples 22 and heating bands 24 electrically heat the extruder cylinder 14 all in a manner well known in the art. While as aforestated the molding powder is usually in granular form, this is not to be taken as a limitation, since other forms, such as ribbons, etc., could be used.

Adjacent the metering section there is provided an orifice or delivery head 26 through which the molten plastic flows under pressure into the second stage 12.

Stage 12, like stage 10, comprises a conventional extruder cylinder 28 and screw 30 having feed zone D, pressure zone E and metering zone F. A drive motor, variable-speed drive and gear reducer 32, thermocouples 34 and heating bands 36 are provided in the usual manner. Adjacent feed zone D there is provided a gas take-off aperture 37 and pressure release valve 38, the purpose of which will hereinafter be made apparent. Adjacent the metering zone F there is provided the usual die or crosshead 40. As will be obvious, stage 10 is physically joined to stage 12 by any suitable means whereby the orifice 26 makes entrance into the pressure zone of stage 12.

In operation and use, the granular plastic is fed to the extruder through hopper 18, the cylinder 14 being heated to the temperature necessary to melt the plastic. As the screw 16 rotates, the plastic is carried forward and progressively melted. Since the melting point of the plastic is substantially higher than the boiling point of any moisture in the plastic, the moisture turns to steam, but being trapped by the molten plastic, it is also carried forward to the orifice 26.

In accordance with my invention, and the structure aforedescribed, the molten plastic and steam are then transferred directly into the graduated pressure zone E of stage 12, it being understood that cylinder 28, like cylinder 14, has been heated to the proper temperature. When the molten plastic is introduced into stage 12, it is carried forward by rotating screw 30, whereas, on the other hand, any trapped steam or gas therein is released during the initial churning action of the screw on the plastic, and being gaseous in form, is free to escape rearwardly through the feed zone of stage 12 and out the pressure release valve 38. The molten plastic, now free of moisture and gas, is then extruded through die or crosshead 40 in the conventional manner.

While it has been found desirable to feed directly from stage 10 to the pressure zone of stage 12 in order that the material will be compressed immediately upon entrance thereto, it will be understood that the material could be fed directly to the metering zone of stage 12.

It has been found necessary to carefully control the pressures created at different points in the extrusion operation. For example, assuming a pressure of 50 atmospheres at orifice 26, it would be necessary to maintain a lower pressure, for example, 40 atmospheres, on the gas take-off aperture 37 of stage 12. The molten plastic would thus first come in contact with screw 30 of stage 12 under 40 atmospheres of pressure, the pressure would increase to approximately 100 atmospheres in the pressure zone E, and would further increase to some 200 atmospheres at the die or crosshead 40. While in general it is desirable to have pressure on the escaping steam or gas to aid the mechanical action of screw 30 in taking hold of the molten plastic, there may be cases where no pressure and even a vacuum may be desirable to aid in the exhaust of the gases. It is essential, however, that pressure on the gas always be less than the pressure created at the point of entry to stage 12.

Figure 2:
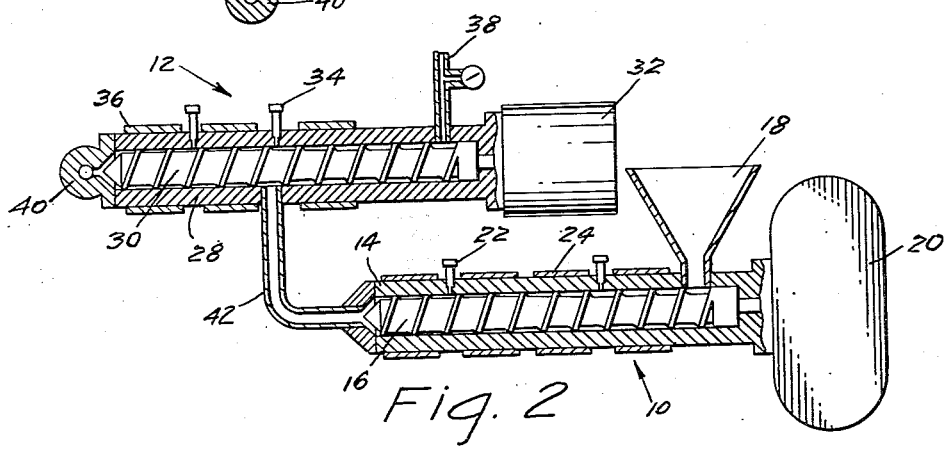
Fig. 2 is a side elevation in section of a modified form thereof.
Figure 3:
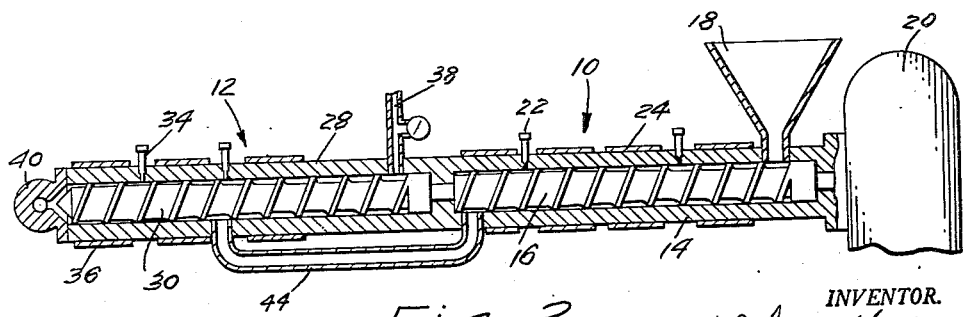
Fig. 3 is still another modification thereof.

Figs. 2 and 3 each show slightly modified arrangements of my extruder. The embodiment of Fig. 2 differs from my preferred form only in that instead of stage 10 being perpendicularly disposed with respect to stage 12, the two cylinders are arranged in spaced parallel relation with a duct 42 provided to transfer the molten plastic from stage 10 to stage 12. Otherwise the parts are conventional and function in an identical manner to the description of my preferred form.

In Fig. 3 the cylinders are positioned in linear alignment with a duct 44 provided to transfer the molten plastic from stage 10 to stage 12. In this embodiment, a single rotating unit may be utilized, thereby eliminating the necessity of separate drive motors. Otherwise the parts function as described with relation to Fig. 1.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. Apparatus for extruding non-dehydrated plastic comprising a first and second cylinder, each having therein an extruder screw, means for heating each of said cylinders and for rotating said screws, said screws each having a feed zone, a pressure zone and a metering zone, means for feeding plastic to said first cylinder feed zone, each cylinder further having a restricted delivery head located just after and adjacent to its respective metering zone, said second cylinder having a pressure release valve therein located adjacent its feed zone, and a passage connecting said first cylinder delivery head to said second cylinder, said passage leading directly to said second cylinder pressure zone.

2. Apparatus for extruding non-dehydrated plastic as set forth in claim 1 further characterized in that the pressure at said pressure release valve is maintained lower than the pressure at said first cylinder delivery head.

3. Apparatus for extruding non-dehydrated plastic as set forth in claim 2 further characterized in that said first and second cylinders are perpendicularly disposed with respect to each other.

4. Apparatus for extruding non-dehydrated plastic as set forth in claim 2 further characterized in that said first and second cylinders are disposed in spaced, parallel relation.

5. Apparatus for extruding non-dehydrated plastic as set forth in claim 2 further characterized in that said first and second cylinders are disposed in linear alignment.

6. Apparatus for extruding non-dehydrated plastic as set forth in claim 5 further characterized in that said first cylinder screw and said second cylinder screw are integral and rotated by common means.

References Cited in the file of this patent

UNITED STATES PATENTS

| | | |
|---|---|---|
| 1,156,096 | Price | Oct. 12, 1915 |
| 2,458,068 | Fuller | Jan. 4, 1949 |
| 2,595,455 | Heston | May 6, 1952 |

FOREIGN PATENTS

| | | |
|---|---|---|
| 915,689 | Germany | July 26, 1954 |